United States Patent [19]

Brekner et al.

[11] Patent Number: 5,422,397
[45] Date of Patent: Jun. 6, 1995

[54] BINARY ALLOYS BASED ON POLYETHER-AMIDES AND CYCLOOLEFIN POLYMERS

[75] Inventors: Michael-Joachim Brekner, Frankfurt am Main; Otto Herrmann-Schönherr, Bensheim, both of Germany

[73] Assignee: Hoechst Aktiengesellschaft, Frankfurt am Main, Germany

[21] Appl. No.: 104,143
[22] PCT Filed: Mar. 16, 1992
[86] PCT No.: PCT/EP92/00570
 § 371 Date: Aug. 16, 1993
 § 102(e) Date: Aug. 16, 1993
[87] PCT Pub. No.: WO92/16564
 PCT Pub. Date: Oct. 1, 1992

[30] Foreign Application Priority Data
Mar. 18, 1991 [DE] Germany .......... 41 08 825.5

[51] Int. Cl.6 .................. C08L 67/00; C08L 77/12
[52] U.S. Cl. ...................................... 525/167; 525/184
[58] Field of Search ................................ 525/184, 167

[56] References Cited

U.S. PATENT DOCUMENTS 5,278,214 1/1994 Moriya et al. ...................... 528/238

FOREIGN PATENT DOCUMENTS 0458365 11/1991 European Pat. Off. .
203060 10/1983 Germany .

OTHER PUBLICATIONS

Chemical Abstract 100 (1984), 140334v., "Thermoplastic Combinations".

*Primary Examiner*—Ana L. Carrillo
*Attorney, Agent, or Firm*—Curtis, Morris & Safford

[57] ABSTRACT

Polymer alloys based on (a) at least one thermoplastic, aromatic polyether-amide having a molecular weight of from 5000 to 40,000 and (b) at least one cycloolefin polymer are prepared. The proportions of the components are 99-50% by weight of (a) and 1-50% by weight of (b), the proportions adding up to 100% by weight, based on the total alloy. The polymer alloys can be used for the production of moldings.

14 Claims, No Drawings

BINARY ALLOYS BASED ON POLYETHER-AMIDES AND CYCLOOLEFIN POLYMERS

DESCRIPTION

Both amorphous and partially crystalline aromatic polyether-amides which can be processed as thermoplastics can be prepared in various molecular weights. These thermoplastic aromatic polyether-amides have been described in a German Patent Application (P 40 38 393) which has an earlier priority date, but was not published before the date of application of the present application; express reference is made to this patent application. These aromatic polyether-amides are a valuable class of polymers which has a high level of properties and is distinguished, inter alia, by good solvent resistance.

However, for some applications, for example as matrix materials for composites, it is desirable for these polyether-amides to have lower melt viscosities and lower water-absorption capacities.

It is known that technologically important properties of polymers, such as melt viscosity and water-absorption capacity, can be adjusted by alloying polymers with other polymers. However, reliable prediction of the properties of an alloy from the properties of the individual components is hitherto still distant. Alloying of polymers therefore remains substantially empirical.

DD-A-203 060 discloses alloys of norbornene-ethylene copolymers and polyamides. Polyamides which can be employed are, in particular, aliphatic polyamides, such as nylon 6 and nylon 6,6, and polyamides containing cycloaliphatic or aromatic chain members. The only example of a fully aromatic polyamide mentioned is poly-m-phenylene isophthalamide, but this cannot be processed by standard techniques for processing thermoplastics, such as extrusion or injection molding.

The object of the invention is therefore to provide alloys of thermoplastic aromatic polyether-amides with other polymers, which alloys have lower melt viscosities and lower water-absorption capacities than do the polyether-amides alone.

The invention relates to polymer alloys containing at least two components (a) and (b), wherein (a) is at least one thermoplastic aromatic polyether-amide of the formula (I)

(I)

in which the symbols —Ar—, —Ar'—, —Ar$_1$—, —Ar$_2$—, —R—, —R'—, —Y—, x, y and z are as defined below:

—Ar— is a divalent, substituted or unsubstituted, aromatic or heteroaromatic radical or an —Ar*—Q—Ar*— group,
in which —Q— is a bond or an —O—, —CO—, —S—, —SO— or —SO$_2$—bridge, and —Ar*— is an aromatic radical, —Ar'— is as defined for —Ar— or is an —Ar—Z—Ar— group where —Z— is a —C(CH$_3$)$_2$— or —O—Ar*—O— bridge, —Ar$_1$— and —Ar$_2$— are identical or different and are each a substituted or unsubstituted para- or meta-arylene radical, for example meta- or para-phenylene, —Y— is a —C(CH$_3$)$_2$—, —SO$_2$—, —S— or —C(CF$_3$)$_2$— bridge, it being possible for up to two different radicals Y to be bonded in the same polymer, the sum of the molar fractions x, y and z is one, the sum of x and z is not equal to y, and x can adopt the value zero, the ends of the polymer chain are fully blocked by monofunctional groups —R and —R' which do not react further in the polymer, where —R and —R', independently of one another, are identical or different, and the polyether-amide has a mean molecular weight in the range from 5000 to 40,000, and (b) is at least one cycloolefin polymer, where the proportion of (a) is 99–50% by weight, and the proportion of (b) is 1–50% by weight, based on the sum of the proportions of (a) and (b). It is preferred to employ 1 or 2 components (a).

It is preferred for the proportion of component (a) to be 98–60% by weight, in particular 95–85% by weight, and that of component (b) to be 2–40% by weight, in particular 5–15% by weight, based on the sum of components (a) and (b).

In component (a), z is preferably greater than x. The molecular weight is adjusted during the preparation of a) by adding the monomer units in non-stoichiometric amounts. The polyether-amides (a) are prepared by polycondensation. When the polycondensation reaction is complete, the ends of the polymer chains are fully blocked by adding at least stoichiometric amounts of monofunctional reagents which react in the polymer to form groups R and R' which do not react further. The terminal groups R and R' are independent of one another and are identical or different, preferably identical. The terminal groups —R and —R' are preferably selected from the group comprising the radicals of the formulae II, III, IV and/or V

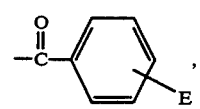
(II)

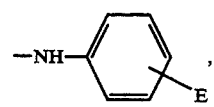
(III)

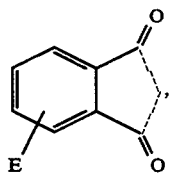
(IV)

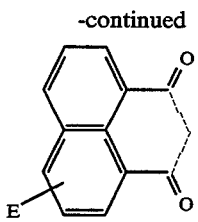

(V)

In the terminal groups IV and V, the terminal nitrogen in the formula I is in the form of an imide nitrogen (and not of NH); in the terminal groups II and III, the terminal nitrogen is in the form of an amide. In the abovementioned formulae, E is a hydrogen or halogen atom, in particular a chlorine, bromine or fluorine atom, or an organic radical, for example an aryl(oxy) group, such as phenoxy, or a $C_1$-$C_3$-alkyl or $C_1$-$C_3$-alkoxy group.

In the preparation of the polyether-amide (a) by reacting one or more dicarboxylic acid derivatives with one or more diamines by the solution or melt condensation process, one of the components is employed in less than the stoichiometric amount, and a chain terminator is added when the polycondensation is complete. It is preferred to employ up to three different dicarboxylic acid derivatives VI and up to three diamines VII and VIII for the preparation of the polyether-amides used.

The polyether-amides employed are preferably prepared by solution condensation.

The solution condensation of the aromatic dicarboxylic dichloride with the aromatic diamines is carried out in an aprotic, polar solvent of the amide type, for example N,N-dimethylacetamide, preferably N-methyl-2-pyrrolidone. If desired, halide salts of metals from the first and/or second group of the Periodic Table of the Elements are added to the solvent in a known manner in order to increase the solvency or to stabilize the polyether-amide solutions. Preferred additives are calcium chloride and/or lithium chloride. The condensation is preferably carried out without adding salt, since the above-described aromatic polyamides are distinguished by high solubility in the abovementioned solvents of the amide type.

In this way, fusible polyether-amides having good mechanical properties, in particular high initial modulus, good tear strength and good dielectric strength, and which allow processing by standard methods for processing thermoplastics, can be prepared if at least one of the starting components is employed in less than the stoichiometric amount. In this way, it is possible to limit the molecular weight in accordance with the known Carothers equation:

$$P_n = \frac{1+q}{1-q}$$

where q is not equal to 1 and simultaneously $$q = \frac{y}{x+z},$$

$p_n$ is the degree of polymerization and
q is the molar ratio between the diacid component and the amine component.

If less than the stoichiometric amount of acid dichloride is used, the chain terminator added at the end of the polymerization reaction is a monofunctional, aromatic acid chloride or acid anhydride, for example benzoyl chloride, fluorobenzoyl chloride, diphenylcarbonyl chloride, phenoxybenzoyl chloride, phthalic anhydride, naphthalic anhydride or 4-chloronaphthalic anhydride.

If desired, chain terminators of this type may be substituted, preferably by fluorine or chlorine atoms. Preference is given to benzoyl chloride or phthalic anhydride, in particular benzoyl chloride.

If less than the stoichiometric amount of the diamine component is used, the chain terminator added at the end of the polycondensation is a monofunctional, preferably aromatic amine, for example fluoroaniline, chloroaniline, 4-aminodiphenylamine, aminobiphenylamine, aminodiphenyl ether, aminobenzophenone or aminoquinoline.

The polycondensation is preferably carried out by polycondensing the diacid chloride in less than the stoichiometric amount with the diamine, and the reactive amino groups remaining are subsequently deactivated by means of a monofunctional acid chloride or diacid anhydride.

In a further preferred embodiment, the diacid chloride is employed in less than the stoichiometric amount and polycondensed with a diamine. The reactive amino terminal groups which remain are subsequently deactivated by means of a monofunctional, preferably aromatic, substituted or unsubstituted acid chloride or acid anhydride.

The chain terminator, the monofunctional amine or acid chloride or acid anhydride, is preferably employed in a stoichiometric or superstoichiometric amount, based on the diacid or diamine components.

The two carbonyl groups attached to the divalent radical Ar are preferably not on adjacent ring carbon atoms (example: phthalic acid). If they are on the same aromatic ring of the radical Ar, the para- or meta-position is preferred. They may also be attached to different rings (example: 2,6-naphthalenedicarboxylic acid). The divalent radical Ar may also be substituted, in particular by one or two branched or unbranched $C_1$-$C_3$-alkyl or alkoxy radicals, aryl or aryloxy radicals, such as phenyl and phenoxy, $C_1$-$C_6$-perfluoroalkyl or perfluoroalkoxy radicals, or by fluorine, chlorine, bromine or iodine atoms. The same applies to the divalent radicals $Ar_1$, $Ar_2$, $Ar'$ and $Ar^*$.

The polyether-amide (a) may simultaneously contain up to three different radicals Ar.

The aromatic radicals, in particular the divalent radicals Ar, $Ar'$, $Ar_1$, $Ar_2$ and $Ar^*$, comprise 1 or 2 isocyclic aromatic rings, such as, for example, naphthalene. Phenylene radicals are preferred. The heteroaromatic radicals Ar and $Ar'$ are derived from a heterocyclic aromatic ring, in particular furan, thiophene, pyridine or a heterocyclic compound comprising 2 fused rings, for example isoquinoline.

Aromatic polyether-amides (a) are prepared by reacting one or more dicarboxylic acid derivatives with one or more diamines by known solution, precipitation or melt condensation processes (P. W. Morgan, Condensation Polymers by Interfacial and Solution methods, Interscience Publishers 1965, and Vollbracht, Aromatic Polyamides, Comprehensive Polymer Sci., Vol. 5, p. 375 (1989)), one of the components being employed in less than the stoichiometric amount, and a chain terminator being added when the polycondensation is complete.

Particularly suitable dicarboxylic acid derivatives for the preparation of the polyether-amides (a) are those of the formula VI

 (VI)

where —Ar— is as defined above, and —W is a fluorine, chlorine, bromine or iodine atom, preferably a chlorine atom, or an —OH or —OR" group, and R" is a branched or unbranched, aliphatic or aromatic radical.

Examples of compounds of the formula VI are:
terephthalic acid
terephthaloyl dichloride
diphenyl terephthalate
isophthalic acid
diphenyl iosphthalate
isophthaloyl chloride
phenoxyterephthalic acid
phenoxyterephthaloyl dichloride
diphenyl phenoxyterephthalate
di(n-hexyloxy)terephthalic acid
bis(n-hexyloxy)terephthaloyl dichloride
diphenyl bis(n-hexyloxy)terephthalate
2,5-furandicarboxylic acid
2,5-furandicarbonyl chloride
diphenyl 2,5-furandicarboxylate
thiophenedicarboxylic acid
naphthalene-2,6-dicarboxylic acid
diphenyl ether 4,4'-dicarboxylic acid
benzophenone-4,4'-dicarboxylic acid
isopropylidene-4,4'-dibenzoic acid
diphenyl sulfone 4,4'-dicarboxylic acid
tetraphenylthiophenedicarboxylic acid
diphenyl sulfoxide-4,4'-dicarboxylic acid
diphenyl thioether 4,4'-dicarboxylic acid and
trimethylphenylindanedicarboxylic acid.

The dicarboxylic acid derivatives of the formula VI are reacted with aromatic diamines, for example of the formula VII

 (VII)

in which Ar'— is as defined above. The following compounds are preferably suitable for this reaction:
m-phenylenediamine
p-phenylenediamine
2,4-dichloro-p-phenylenediamine
diaminopyridine
1,2-, 1,3- and 1,4-bis(3- and 4-aminophenoxy)benzene
2,6-bis(aminophenoxy)pyridine
3,3'-dimethylbenzidene
4,4'- and 3,4'-diaminodiphenyl ether
isopropylidene-4,4'-dianiline
p,p'- and m,m'-bis(4-aminophenylisopropylidene)benzene
4,4'- and 3,3'-diaminobenzophenone
4,4'- and 3,3'-diaminodiphenyl sulfone and
bis(2-amino-3-methylbenzo)thiophene S,S-dioxide.

Other aromatic diamines which can be employed are those of the formula VIII

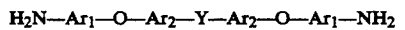 (VIII)

where Ar₁, Ar₂ and Y are as defined above. Particularly suitable aromatic diamines of the formula VIII are the following:

2,2-bis[4-(3-trifluoromethyl-4-aminophenoxy)phenyl]propane,
bis[4-(4-aminophenoxy)phenyl]sulfide,
bis[4-(3-aminophenoxy)phenyl]sulfide,
bis[4-(3-aminophenoxy)phenyl]sulfone,
bis[4-(4-aminophenoxy)phenyl]sulfone,
2,2-bis[4-(4-aminophenoxy)phenyl]propane,
2,2-bis[4-(3-aminophenoxy)phenyl]propane,
2,2-bis[4-(2-aminophenoxy)phenyl]propane and
1,1,1,3,3,3-hexafluoro-2,2-bis[4-(4-aminophenoxy)phenyl]propane.

These amines are known to persons skilled in the art or can be obtained in a simple manner by known methods. For example, 1,4-bis(p-chlorophenoxy)benzene (="BCB") is obtained from p-dichlorobenzene and p-chlorophenol. BCB+p-aminothiophenol gives (NH₂C₆H₄—S—C₆H₄O)₂C₆H₄, a diamine containing 5 aromatic rings.

The molar ratio (MR) between the acid component and the diamine component can be varied in the range from 0.90 to 1.10, exact stoichiometry (MR=1.00) of the bifunctional components being excluded, since otherwise the desired molecular weight can only be achieved with difficulty.

The molar ratio MR is preferably in the range from 0.90 to 0.99 and from 1.01 to 1.10, particularly preferably in the range from 0.93 to 0.98 and from 1.02 to 1.07, in particular in the range from 0.95 to 0.97 and from 1.03 to 1.05.

The polycondensation temperature is usually in the range from −20° to +120° C., preferably from +10° to +100° C.

Particularly good results are achieved at reaction temperatures of from +10° to +80° C. The polycondensation reactions are preferably carried out so that, when the reaction is complete, from 2 to 40% by weight, preferably from 5 to 30% by weight, of polycondensate is present in the solution. For specific applications, the solution may, if required, be diluted with N-methyl-2-pyrrolidone or other solvents, for example dimethylformamide, N,N-dimethylacetamide or butylcellosolve or concentrated under reduced pressure (thin-film evaporator).

When the polycondensation is complete, the hydrogen chloride formed, which is loosely bonded to the amide solvent, is removed by adding acid-binding assistants, for example lithium hydroxide, calcium hydroxide, but in particular calcium oxide, propylene oxide, ethylene oxide or ammonia. In a particular embodiment, the "acid-binding" agent used is pure water, which dilutes the hydrochloric acid and simultaneously serves to precipitate the polymer.

In order to isolate the polyether-amide, a precipitant can be added to the solution and the coagulated product filtered off. Examples of typical precipitants are water, methanol and acetone, which may, if desired, also contain pH-controlling additives, such as, for example, ammonia or acetic acid.

The polyether-amide is preferably isolated by comminuting the polymer solution using an excess of water in a cutting mill. The finely comminuted, coagulated polymer particles simplify the subsequent washing steps (removal of the secondary products formed from the hydrogen chloride) and the drying of the polymer (avoidance of inclusions) after filtering off. Subsequent comminution is also superfluous since a free-flowing product is formed directly.

Apart from the solution condensation described, which is regarded as being a readily accessible process, it is also possible, as stated above, to use other conventional processes for the preparation of polyamides, such as, for example, melt or solid condensation. In addition to the condensation with regulation of the molecular weight, these processes may also contain purification or washing steps and the addition of suitable additives. The additives may, in addition, also be added to the isolated polymer subsequently during thermoplastic processing.

The polyether-amides (a) have a Staudinger index $\eta$ of from 0.4 to 1.5 dl/g, preferably from 0.5 to 1.3 dl/g, particularly preferably from 0.6 to 1.1 dl/g, measured at 25° C. in N-methyl-2-pyrrolidone.

Cycloolefin polymers (b) which are suitable for the alloys of the invention contain structural units derived from at least one monomer of the formulae IX to XIV or XV

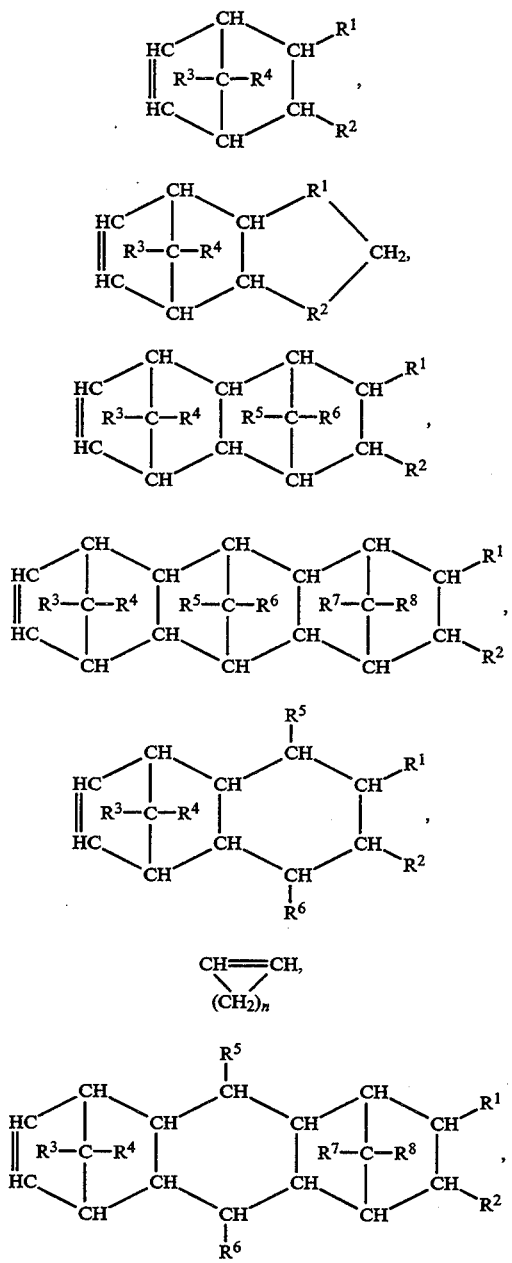

in which $R^1$, $R^2$, $R^3$, $R^4$, $R^5$, $R^6$, $R^7$ and $R^8$ are identical or different and are hydrogen atoms or $C_1$–$C_8$-alkyl radicals, it being possible for identical radicals in the various formulae to have different meanings, and n is an integer from 2 to 10.

In addition to the structural units derived from at least one monomer of the formulae IX to XV, the cycloolefin polymers of the invention may contain further structural units derived from at least one acyclic 1-olefin of the formula XVI

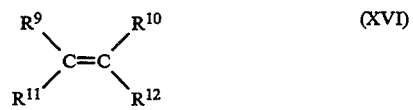

in which $R^9$, $R^{10}$, $R^{11}$ and $R^{12}$ are identical or different and are hydrogen atoms or $C_1$–$C_8$-alkyl radicals.

Preferred comonomers of the formula XVI are ethylene and propylene. In particular, copolymers of polycyclic olefins of the formula IX or XI and the acyclic olefins of the formula XVI, preferably of norbornene and ethylene, are employed. Particularly preferred cycloolefins are norbornene and tetracyclododecene, which may be substituted by $C_1$–$C_6$-alkyl, ethylene-norbornene copolymers being of particular importance. Of the monocyclic olefins of the formula XV, cyclopentene, which may be substituted, is preferred. Polycyclic olefins, monocyclic olefins and open-chain olefins are also taken to mean mixtures of two or more olefins of the particular type. This means that cycloolefin homopolymers and copolymers, such as bipolymers, terpolymers and multipolymers, can be employed.

The cycloolefin polymerizations which proceed with opening of the double bond can be catalyzed homogeneously, i.e. the catalyst system is soluble in the polymerization medium (DE-A-3 922 546 and EP-A-0 203 799), or can be catalyzed by means of a classical Ziegler catalyst system (DD-A-222 317 and DD-A-239 409).

Cycloolefin homopolymers and copolymers which contain structural units derived from monomers of the formulae IX to XIV or XV are preferably prepared with the aid of a homogeneous catalyst comprising a metallocene whose central atom is a metal from the group comprising titanium, zirconium, hafnium, vanadium, niobium and tantalum and which forms a sandwich structure together with two mutually bridged monocyclic or polycyclic ligands, and an aluminoxane. The bridged metallocenes are prepared by a known reaction scheme (cf. J. Organomet. Chem. 288 (1985) 63–67, and EP-A-320 762). The aluminoxane, which functions as a cocatalyst, can be obtained by various methods (cf. S. Pasynkiewicz, Polyhedron 9 (1990) 429). The structure and synthesis of this catalyst and the conditions which are suitable for the polymerization of these cycloolefins are described in detail in DE-A-3 922 546 and in German Patent Application P 4 036 264.7. Preference is given to cycloolefin polymers having a viscosity of greater than 20 cm³/g, measured in decahydronaphthalene at 135° C., and a glass transition temperature of from 100° to 200° C.

The alloys may also contain, as constituents (b), cycloolefin polymers obtained from cycloolefins with ring opening in the presence of, for example, tungsten-, molybdenum-, rhodium- or rhenium-containing catalysts. The cycloolefin polymers obtained have double bonds which can be removed by hydrogenation (U.S. Pat. No. 3,557,072 and U.S. Pat. No. 4,178,424).

The cycloolefin polymers employed for the alloys of the invention may also be modified by grafting with at least one monomer selected from the group comprising (1) α,β-unsaturated carboxylic acids and/or derivatives thereof, (2) styrenes, (3) organic silicone components containing an olefinic unsaturated bond and a hydrolyzable group and (4) unsaturated epoxy components. The modified cycloolefin polymers obtained have excellent properties at a similar level to those of the unmodified cycloolefin polymers. In addition, they specifically have good adhesion to metals and synthetic polymers. The good compatibility with other polymers should be emphasized.

The alloys of the invention are prepared by known alloying methods. For example, the alloy partners are extruded jointly in an extruder in the form of powders or granules to give extrudates, and the extrudates are granulated and converted into the desired shape, for example by compression molding or injection molding.

The alloys may contain additives, for example thermal stabilizers, UV stabilizers, impact modifiers or reinforcing additives, such as glass fibers or carbon fibers.

The alloys may advantageously be employed for the production of moldings by injection molding or extrusion, for example in the form of fibers, films, tubes or cable coverings.

The invention is described in greater detail by the examples.

The polymers below were synthesized and employed in the examples:

Polyether-amide I [PEA I] having a Staudinger index of 0.6 dl/g, measured in N-methyl-2-pyrrolidone at 25° C., and a molecular weight $M_n$ (GPC) of 27,000 g/mol (relative to polystyrene) and containing recurring units of the formula below:

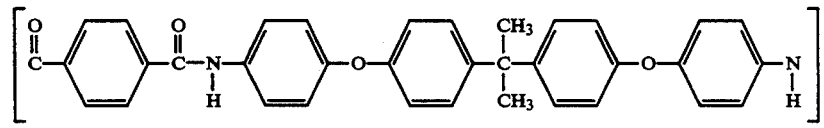

Preparation of PEA I 4105 g (10 mol) of 2,2-bis[4-(4-aminophenoxy)-phenyl]-propane were dissolved in 15.24 l of N-methylpyrrolidone under nitrogen in an enameled 40 l stirred reactor with heating jacket. After the temperature had equilibrated at 25° C., 1959 g (9.65 mol=96.5%) of terephthaloyl chloride, dissolved in 5 l of N-methylpyrrolidone, were added. 30 minutes after the mixture had reached 70° C., 112.5 g (0.8 mol) of benzoyl chloride were added, after a further 30 minutes the mixture was cooled to 60° C., and 566 g (10.1 mol) of CaO as a suspension in 305 g of N-methylpyrrolidone were added. After 1 hour, the clear, viscous solution was discharged from the reactor, diluted from a polymer content of 20% to about 13% by means of about 13 l of N-methylpyrrolidone, and filtered under an $N_2$ pressure of 3 bar, and finally the polymer was precipitated as a fine powder (particle size≦1 mm) using water. The polymer powder was washed four times for 2 hours in each case with 60 l of fresh, demineralized water at 95°–98° C. in a stirred pressure filter, dried roughly in a hot stream of nitrogen and washed a further twice with 60 l of acetone (2 hours, 60° C.). The product was predried overnight in a stream of nitrogen, subsequently dried for 14 hours at 130° C. (100 mbar) and finally dried to completion for 8 hours at 150° C. (<10 mbar). Yield 5.0 kg (93%).

Polyether-amide II [PEA II] having a Staudinger index of 0.6 dl/g, measured in N-methyl-2-pyrrolidone at 25° C., and a molecular weight $M_n$ (GPC) of 27,000 g/mol (relative to polystyrene), and containing structural units q and r of the formulae:

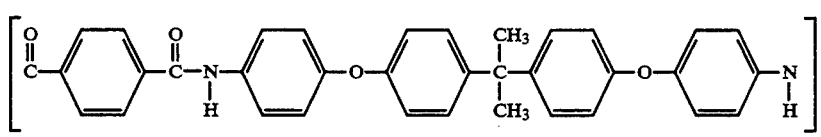

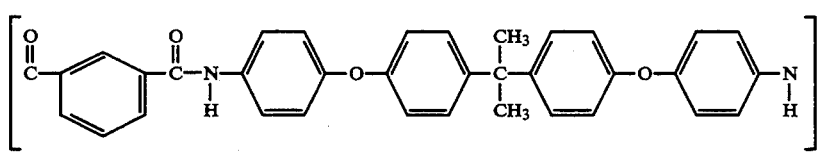

where the proportion of q is 80 mol % and the proportion of r is 20 mol %.

Preparation of PEA II 4105 g (10 mol) of 2,2-bis[4-(4-aminophenoxy)-phenyl]-propane were reacted analogously to the preparation of PEA I with 1949 g (9.6 mol) of terephthaloyl and isophthaloyl chloride in the ratio 8:2 and with 126.5 g (0.9 mol) of benzoyl chloride in 20.8 kg of N-methyl-2-pyrrolidone.

Cycloolefin copolymer I (COC I)

A) Preparation of diphenylmethylene(9-fluorenyl)cyclopentadienylzirconium dichloride A solution of 5.10 g (30.7 mmol) of fluorene in 60 cm³ of THF was treated slowly at room temperature with 12.3 cm³ (30.7 mmol) of a 2.5 molar hexane solution of n-butyllithium. After 40 minutes, 7.07 g (30.7 mmol) of diphenylfulvene were added to the orange solution, and the mixture was stirred overnight. 60 cm³ of water were added to the dark-red solution, and the solution, which had become yellow, was extracted with ether. The ether phase was dried over MgSO$_4$, concentrated and left to crystallize at −35° C. 5.1 g (42%) of 1,1-cyclopentadienyl-(9-fluoroenyl)diphenylmethane were obtained as a beige powder.

2.0 g (5.0 mmol) of the compound were dissolved in 20 cm³ of THF, and 6.4 cm³ (10 mmol) of a 1.6 molar solution of butyllithium in hexane were added at 0° C. The mixture was stirred at room temperature for 15 minutes, the solvent was stripped off, and the red residue was dried in an oil-pump vacuum and washed several times with hexane. After having been dried in an oil-pump vacuum, the red powder was added at −78° C. to a suspension of 1.16 g (5.00 mmol) of ZrCl$_4$. The batch was slowly warmed and then stirred at room temperature for a further 2 hours. The pink suspension was filtered through a G3 frit. The pink residue was washed with 20 cm³ of CH$_2$Cl$_2$, dried in an oil-pump vacuum and extracted with 120 cm³ of toluene. The solvent was stripped off and the residue dried in an oil-pump vacuum to give 0.55 g of the zirconium complex in the form of a pink crystal powder.

The orange filtrate from the reaction batch was concentrated and left to crystallize at −35° C. A further 0.45 g of the complex crystallized from CH$_2$Cl$_2$.

Overall yield 1.0 g (36%). Correct elemental analysis. The mass spectrum showed M+ =556. $^1$H-NMR spectrum (100 MHz, CDCl$_3$): 6.90–8.25 (m, 16, Flu-H, Ph-H), 6.40 (m, 2, Ph-H), 6.37 (t, 2, Cp-H), 5.80 (t, 2, Cp-H).

B) Preparation of COC I

A clean and dry 75 dm³ polymerization reactor fitted with a stirrer was flushed with nitrogen and then with ethylene and filled with 22,000 g of norbornene melt (Nb). The reactor was then heated to a temperature of 70° C. with stirring, and 10 bar of ethylene were injected.

580 cm³ of a toluene solution of methylaluminoxane (10.1% by weight of methylaluminoxane having a molecular weight of 1300 g/mol, determined cryoscopically) were then metered into the reactor, and the mixture was stirred at 70° C. for 15 minutes, during which the ethylene pressure was kept at 10 bar by subsequent metering-in. In parallel, 500 mg of diphenylmethylene(9-fluoroenyl)cyclopentadienylzirconium dichloride were dissolved in 1000 cm³ of a toluene solution of methylaluminoxane (concentration and quality, see above) and preactivated by standing for 15 minutes. The solution of the complex (catalyst solution) was then metered into the reactor (in order to reduce the molecular weight, hydrogen can be introduced into the reactor via a transfer channel immediately after the catalyst had been metered in). The mixture was then polymerized at 70° C. for 140 minutes with stirring (750 rpm), the ethylene pressure being kept at 10 bar by subsequent metering-in. The reactor contents were then rapidly discharged into a stirred vessel containing 200 cm³ of isopropanol (as stopper). The mixture was precipitated in acetone and stirred for 10 minutes, and the suspended polymeric solid was then filtered off.

A mixture of two parts of 3N hydrochloric acid and one part of ethanol was then added to the filtered-off polymer and the mixture was stirred for 2 hours. The polymer was then filtered off again, washed with water until neutral and dried at 80° C. and 0.2 bar for 15 hours. 4400 g of product were obtained. A viscosity of 142 cm³/g and a glass transition temperature ($T_g$) of 168° C. were measured on the product.

Cycloolefin copolymer II [COC II]

A) Preparation of rac-dimethylsilylbis(1-indenyl)-zirconium dichloride

All the work operations below were carried out in an inert-gas atmosphere using absolute solvents (Schlenk Technik).

A solution of 30 g (0.23 mol) of indene (technical grade, 91%), filtered through aluminum oxide, in 200 cm³ of diethyl ether was treated, with ice cooling, with 80 cm³ (0.20 mol) of a 2.5 molar solution of n-butyllithium in hexane. The batch was stirred at room temperature for a further 15 minutes, and the orange solution was added via a cannula over the course of 2 hours to a solution of 13.0 g (0.10 mol) of dimethyldichlorosilane (99%) in 30 cm³ of diethyl ether. The orange suspension was stirred overnight and extracted three times by shaking with 100–150 cm³ of water. The yellow organic phase was dried twice over sodium sulfate and evaporated in a rotary evaporator. The orange oil which remained was kept at 40° C. for 4 to 5 hours in an oil-pump vacuum and freed from excesss indene, a white precipitate being formed. By adding 40 cm³ of methanol and crystallizing the product at −35° C., a total of 20.4 g (71%) of the compound (CH$_3$)$_2$Si(Ind)$_2$ were isolated as a white to beige powder. M.p. 79°–81° C. (2 diastereomers).

A solution of 5.6 g (19.4 mmol) of (CH$_3$)$_2$Si(Ind)$_2$ in 40 cm³ of THF was treated slowly at room temperature with 15.5 cm³ (38.7 mmol) of a 2.5 molar hexane solution of butyllithium. After 1 hour from completion of the addition, the dark-red solution was added dropwise over the course of 4–6 hours to a suspension of 7.3 g (19.4 mmol) of ZrCl$_4$·2THF in 60 cm³ of THF. The mixture was stirred for 2 hours, and the orange precipitate was filtered off with suction through a glass frit and recrystallized from CH$_2$Cl$_2$. 1.0 g (11%) of a rac-(CH$_3$)$_2$Si(Ind)$_2$ZrCl$_2$ was obtained in the form of orange crystals, which gradually decompose from 200° C.

Correct elemental analysis. The EI mass spectrum showed M+ =448. $^1$H-NMR spectrum (CDCl$_3$): 7.04–7.60 (m, 8, arom. H), 6.90 (dd, 2, $\beta$-Ind H), 6.08 (d, 2, $\alpha$-Ind H), 1.12 (s, 6, SiCH$_3$).

B) Preparation of COC II

A clean and dry 1.5 dm³ polymerization reactor fitted with stirrer was flushed with nitrogen and then with ethylene and filled with a solution of 180 g of norbornene in 750 cm³ of toluene. The reactor was then heated to a temperature of 20° C. with stirring, and 1 bar of ethylene was injected.

20 cm³ of a toluene solution of methylaluminoxane (10.1% by weight of methylaluminoxane having a molecular weight of 1300 g/mol, determined cryoscopically) were then metered into the reactor, and the mixture was stirred at 20° C. for 15 minutes, the ethylene pressure being kept at 1 bar by subsequent metering-in (saturation of the toluene with ethylene). In parallel, 60 mg of rac-dimethylsilyl-bis(1-indenyl)zirconium dichloride were dissolved in 10 cm³ of a toluene solution of methylaluminoxane (concentration and quality, see above) and preactivated by standing for 15 minutes. The solution of the complex was then metered into the reactor. The mixture was then polymerized at 20° C. for 3 hours with stirring (750 rpm), the ethylene pressure being kept at 10 bar by subsequent metering-in. The reactor contents were then rapidly discharged into a stirred vessel containing 100 cm³ of isopropanol. 2 dm³ of acetone were added and the mixture was stirred for 10 minutes, and the suspended polymeric solid was then filtered off.

The filtered-off polymer was then introduced into 300 cm³ of a mixture of two parts of 3N hydrochloric acid and one part of ethanol, and this suspension was stirred for 2 hours. The polymer was then filtered off again, washed with water until neutral and dried at 80° C. and 0.2 bar for 15 hours. 54.1 g of product were obtained. A viscosity of 177 cm³/g and a glass transition temperature ($T_g$) of 145° C. were measured on the product.

The polymers listed were first dried (130° C., 24 hours, vacuum) and subsequently jointly extruded, in various ratios by weight, in a measuring extruder (HAAKE, Rheocord System 90/Rheomex 600, Karlsruhe, Germany) under an inert gas (argon) and granulated. The resultant granules were dried (130° C., 24 hours, vacuum) and subsequently used to measure the flow properties (melt flow index tester MPS-D from Goettfert, Buchen, Germany, and capillary viscometer) or dried in an evacuable press (130° C., 24 hours, vacuum) and subsequently pressed to form sheets (340° C., 10 bar, 5 minutes) in order to measure the water-absorption capacity (storage time: 13 days at 23° C. and a relative atmospheric humidity of 85%). The Staudinger indices were determined as described in "Praktikum der makromolekularen Chemie" [Practical Macromolecular Chemistry] by Braun, Cherdron and Kern, Hüttig Verlag, Heidelberg.

The melt flow index was determined in accordance with DIN 53735-MFI-B (plunger load 5 kp, 340° C., cylinder: internal dimensions 9.55±0.01 mm, length at least 115 mm, exit nozzle 2.095±0.005 mm). The viscosities were determined in accordance with DIN 53728 (solvent: decahydronaphthalene, 135° C., concentration: 0.001 g/cm³).

EXAMPLE A

PEA I was extruded together with COC I in various weight ratios by means of a twin-screw extruder (all four zones at 340° C.), and the extrudate was granulated. The granules were subsequently dried for 24 hours at 130° C. in vacuo and used to measure the flow properties and the water-absorption capacity of the alloys. Table 1 shows the data obtained.

TABLE 1

| \multicolumn{4}{c}{Physical properties of the PEA I/COC I alloy} | | | |
|---|---|---|---|
| PEA I [% by weight] | COC I [% by weight] | MFI [g/10 min] | Water-absorption capacity [% by weight] |
| 100 | 0 | 6 | 2.30 |
| 90 | 10 | 11 | 1.40 |
| 0 | 100 | 55 | 0.05 |

The results show that the alloys of the invention have a lower melt viscosity and water-absorption capacity than do the polyether-amides alone.

EXAMPLE B

PEA II was extruded together with COC II in various weight ratios by means of a twin-screw extruder (all four zones at 340° C.), and the extrudate was granulated. The granules were subsequently dried for 24 hours at 130° C. in vacuo and used to measure the flow properties and the water-absorption capacity of the alloys. Table 2 shows the data obtained.

TABLE 2

| \multicolumn{4}{c}{Physical properties of the PEA II/COC II alloy} | | | |
|---|---|---|---|
| PEA I [% by weight] | COC I [% by weight] | MFI [g/10 min] | Water-absorption capacity [% by weight] |
| 100 | 0 | 7 | 2.50 |
| 90 | 10 | 11 | 1.20 |
| 0 | 100 | 48 | 0.05 |

The results show that the alloys of the invention have a lower melt viscosity and water-absorption capacity than do the polyether-amides alone.

The examples below relate to the preparation of polyether-amides (a).

EXAMPLES

The Staudinger index $[\eta]_o$ was determined in N-methylpyrrolidone at 25° C. The following abbreviations were used for the examples below:
BAS=2,2-bis[4-(4-aminophenoxy)phenyl]-propane
TPC=terephthaloyl chloride
IFC=isophthaloyl chloride
FDC=2,5-furandicarbonyl chloride
FBC=4-fluorobenzoyl chloride
BCl=benzoyl chloride
NMP=N-methylpyrrolidone
CaO=calcium oxide
E-mod.=modulus of elasticity
MFI=melt flow index
DSC=differential scanning calorimetry
$M_W$=weight average molecular weight
$M_n$=number average molecular weight
$D=M_w/M_n$=polydispersity, nonuniformity, molecular weight distribution
TGA=thermogravimetric analysis
$T_g$=glass transition temperature (determined as the inflection point of the glass state in the DCS)
PS=polystyrene, M(PS)=apparent molecular weight determined in the GPC relative to polystyrene
PO=1,2-propylene oxide
BAPS=bis[4-(4-aminophenoxy)phenyl]sulfone
GPC=gel permeation chromatography
PA=phthalic anhydride
Demin. water=demineralized water
UL 94=Underwriters Laboratories (USA) Bulletin 94 (test standard for flammability)
MH=Mark/Houwink equation: $[\eta]_o = k \cdot M_w^a$
$[\eta]_o$=Staudinger index, unit dl/g
$\eta_m$ =melt viscosity, unit Pa.s
DMF=dimethylformamide
DMAC=N,N-dimethylacetamide

EXAMPLE 1

Polyether-amide made from 2,2-bis [4-(4-aminophenoxy)-phenyl]propane, terephthalic acid and benzoyl chloride in N-methylpyrrolidone:

4105 g (10 mol) of BAB were dissolved in 15.24 l of NMP under nitrogen in an enameled 40 l stirred reactor with heating jacket. After the temperature had equilibrated at 25° C., 1959 g (9.65 mol=96.5%) of TPC, dissolved in 5 l of NMP, were added. 30 minutes after the mixture had reached 70° C., 112.5 g (0.8 mol) of BCl were added, after a further 30 minutes the mixture was cooled to 60° C., and 566 g (10.1 mol) of CaO as a suspension in 305 g of NMP were added. After 1 hour, the clear, viscous solution was discharged from the reactor, diluted from a polymer content of 20% to about 13% by means of about 13 l of NMP, and filtered under an $N_2$ pressure of 3 bar, and finally the polymer was precipitated as a fine powder (particle size $\leq$ 1 mm) using water. The polymer powder was washed four times for 2 hours in each case with 60 l of fresh, demin. water at 95°–98° C. in a stirred pressure filter, dried roughly in a hot stream of nitrogen and washed a further twice with 60 l of acetone (2 hours, 60° C.). The product was predried overnight in a stream of nitrogen, subsequently dried for 14 hours at 130° C. (100 mbar) and finally dried to completion for 8 hours at 150° C. (<10 mbar). Yield 5.0 kg (93%). $[\eta]_o = 1.06$ dl/g; $M_w = 40,000$ g·mol$^{-1}$; ash content: 200 ppm; GPC: $M_n$ (PS) = 50,000, D = 2.1.

EXAMPLES 2–7

In an analagous manner as in Example 1, 4105 g (10 mol) of BAB were reacted with 1949 g (9.6 mol = 96%) of TPC or isophthaloyl chloride and 126.5 g (0.9 mol) of BCl in 20.8 kg of NMP:

| Ex. | Ratio TPC/IPC | Staudinger index $[\eta]_o$/dl/g | $M_n$ (PS) from GPC | D | $M_w$ from MH | $T_g$[b]/°C. |
|---|---|---|---|---|---|---|
| 2 | 1/0 | 0.86 | 39,000 | 2.1 | 36,000 | 227 |
| 3 | 8/2 | 0.69 | 34,000 | 2.2 | 26,000 | 221 |
| 4 | 7/3 | 0.68 | 32,000 | 2.2 | 25,000 | 224 |
| 5 | 6/4 | 0.68 | 36,000 | 2.1 | 25,000 | 222 |
| 6 | 5/5 | 0.68 | 35,000 | 2.0 | 25,000 | 226 |
| 7[a] | 7/3 | 0.80 | 44,000 | 2.0 | 32,000 | 227 |

[a]Example 7 as for Example 4, but TPC/BAB = 965/1000 (molar ratio)
[b]Polymers 3–7 are X-ray amorphous.

EXAMPLE 8

Polyether-amide made from BAB, TPC, 4-fluorobenzoyl chloride and 1,2-propylene oxide in NMP:

246.3 g (0.6 mol) of BAB were dissolved in 1615 g of dry NMP under nitrogen. 118.16 g (0.582 mol = 97%) of TPC were added at 10° C. The mixture was warmed to 50° C. (about 0.5 hour), and 5.7 g (36 mmol = 6%) of FBC were added. After 40 minutes, a mixture of 73.2 g (1.26 mol) of PO and 88 g of NMP was added dropwise via a dropping funnel. The mixture was filtered, and the product was precipitated in demineralized water and washed several times with hot demin. water and subsequently a number of times with acetone. The product was predried at about 100 mbar and finally dried for 8 hours at 150° C. and 10 mbar. Ash content: 460 ppm.

EXAMPLE 9

287.4 g (0.7 mol) of BAB were dissolved in 1708 g of dry NMP under nitrogen. 139.27 g (0.686 mol = 98%) of TPC were added at 3° C. The mixture was warmed to 50° C., and 5.6 g (35 mmol = 5%) of FBC were added. After 1 hour, a mixture of 85.4 g (1.47 mol) of PO and 88 g of NMP was added dropwise via a dropping funnel. Work-up was as in Example 8. Ash content: 350 ppm.

EXAMPLE 10

Polyether-amide made from BAB, TPC, isophthaloyl chloride, FBC and PO in NMP:

410.5 g (1.0 mol) of BAB were dissolved in 1816 g of dry NMP under nitrogen. A homogeneous mixture of 99.48 g of each of TPC and IPC (in each case 0.49 mol, together 0.98 mol = 98%) was added at 5° C. and subsequently rinsed with 100 ml of NMP. When an internal temperature of 50° C. had been reached (about 0.5 hour), 6.34 g (40 mmol = 4%) of FBC were added. After 1 hour, a mixture of 122 g (2.1 mol) of PO and 147 g of NMP was added dropwise. Work-up was as in Example 8. Ash content: 100 ppm.

TABLE

Examples 8–10

| Ex. | Molar ratio % | $[\eta]_o$[a] | % F (NMR)[b] | % F (EA)[c] | Fluorine content calc./%[d] | Ash content/ ppm |
|---|---|---|---|---|---|---|
| 8 | 97 | 1.10 | 0.195 + 0.010 | 0.18 | 0.21 | 460 |
| 9 | 98 | 1.40 | 0.157 + 0.008 | 0.14 | 0.14 | 350 |
| 10 | 98 | 1.35 | 0.135 + 0.007 | 0.11 | 0.14 | |

[a]Staudinger index in dl/g
[b]Measured as the 4-fluorobenzamide terminal group in the $^{19}$F-NMR spectrum
[c]Elemental analysis (EA)
[d]Calculated from $M_n = \frac{1+q}{1-q} \cdot 270 = \frac{3800}{F/\%}$ and $[\eta]_o = k \cdot M_w{}^a$ with $D = \frac{M_w}{M_n} = 2$ In polymers 8–10 according to the invention, 79–100% of the fluorine from the 4-fluorobenzamide terminal groups was recovered.

EXAMPLES 11, 12 and 13

This series of experiments shows that an excess of chain terminator (here BCl) does not adversely affect the fusible polymer.

| Ex. | %[a] | $[\eta]_o$/dl/g | $M_n$(PS)/gmol$^{-1}$ | D |
|---|---|---|---|---|
| 11 | 8 | 0.95 ± 0.04 | 62,000 | 1.81 |
| 12 | 9 | 0.96 ± 0.04 | 63,000 | 1.82 |
| 13 | 10 | 1.03 ± 0.05 | 61,000 | 1.83 |
| Mean | / | 0.98 | 62,000 | 1.82 |

[a]Mole percent of chain terminator benzoyl chloride (BCl); 7 = stoichiometric

The experiments showed—within expermiental accuracy—no difference between the polymers 11, 12 and 13. The samples also behaved in a comparable manner in a measuring compounder at 340° C.

EXAMPLE 11

410.5 g (1.0 mol = 100%) of BAB were introduced into 2009 g of dry NMP at 3° C. under nitrogen, and 195.91 g (0,965 mol = 96.5%) of TPC were added. The mixture was warmed first to 50° C. and subsequently to 70° C. (about 0.5 h). 11.24 g (0.08 mol = 8%) of BCl were added, the mixture was stirred at 70° C. for a further 30 minutes, and finally a liquid mixture of 128 g of PO and 154 g of NMP was added dropwise. Work-up was as in Example 8. Ash content: 98 ppm.

EXAMPLE 12

Procedure as for Example 11, but 9% = 0.09 mol = 12.65 g of BCl were added instead of 8%.

EXAMPLE 13

Procedure as for Example 11, but 10% = 0.1 mol = 14.57 g of BCl were added instead of 8%. Ash content: 59 ppm

EXAMPLE 14

Polyether sulfone amide made from bis[4-(4-aminophenoxy)phenyl]sulfone, TPC, IPC and BCl in NMP:

As in Example 1, but with the following starting materials:
3676 g (8.5 mol) of BAPS (purity 98.6%)

828.3 g (4.08 mol) each of IPC and TPC (8.16 mol=96%)
106.8 g (0.76 mol=9%) of BCl and
518 g (9.24 mol) of CaO in a total of 18,270 g of NMP.

Instead of acetone, which acts as a plasticizer, methanol was used for rinsing.

Staudinger index: $[\eta]_o=0.81$ dl/g GPC: $M_n$ (PS)=56,000 g/mol; $D=M_w/M_n=2.2$

EXAMPLE 15

Phthalic anhydride as chain terminator
Polyether-amide made from BAB, TPC, phthalic anhydride and PO in NMP:

410.5 g (1.0 mol=100%) of BAB were introduced into 2020 g of dry NMP at 3° C. under nitrogen, and 106.93 g (0.97 mol=97%) of TPC were added. The mixture was subsequently heated to 50° C. while stirring was continued, and 8.89 g (0.06 mol=6%) of PSA were added. After 1 hour, a mixture of 118 g of PO and 143 g of NMP was added dropwise. The mixture was worked up as described in Example 8 and additionally dried at 200° C. (3 hours), giving 505 g (93%) of a colorless polymer powder which had the following properties:

Staudinger index: $[\eta]_o-1.1$ dl/g GPC: $M_n$ (PS)=66,000 g/mol, $D=M_w/M_n=2.4$.

The 300 MHz $^1$H-NMR spectrum and the corresponding $^{13}$C-NMR spectrum (solvent DMSO-d$_6$) showed the following signals, which are characteristic of the phthalimido terminal group:

7.86–7.96 ppm (m, 2 mol %), and 124, 132, 135 and 167 ppm. Within the limits of measurement accuracy, all the terminal groups are in the form of the phthalimide. The compounding experiment at 340° C. showed no destruction of the melt after 30 minutes.

EXAMPLE 16

Polyether-amide using NH$_3$ gas as neutralizer
Example 11 was repeated, with the difference that NH$_3$ gas was passed into the solution after 30 minutes from addition of the BCl, and, after a further 30 minutes, 50 ml of glacial acetic acid were added to buffer the excess of NH$_3$. The precipitated NH$_4$Cl was filtered off, and the product was worked up as described above in Example 8.

Staudinger index: $[\eta]_o=0.96$ dl/g GPC:$M_n$ (GPC)=53,000 g/mol, D=2.1 Ash content: 156 ppm.

EXAMPLE 17

Polyether-amide using water as HCl binder
Example 11 was repeated, but no neutralizer was added; instead, the hydrochloric acid solution of the polymer was added dropwise from a glass dropping funnel directly into demin. water. The water thus served not only to precipitate the polymer, but also to bind the formed HCl as aqueous, dilute hydrochloric acid. After work-up as in Example 8, an ash content of 30 ppm was determined.

EXAMPLE 18

Copolymer with a second diamine
Example 8 was repeated, but 20 mol % of the BAB were replaced by 4,4'-diamino-3,3'-dimethylbiphenyl, and the FBC was replaced by BCl. The polymer worked up and dried as in Example 8 had a glass transition temperature (DSC) of 228° C. Staudinger index: $[\eta]_o=1.09$ dl/g, corresponding to $M_w=51,000$ g/mol. GPC: $M_n=66,000$ g/mol; D=2.1.

EXAMPLES 19–24

Amides were prepared in corresponding manner to the above examples from BAB and 2,5-furandicarbonyl dichloride as one of the acid components.

| Ex. | % FDC | % IPC | % TPC | Molar ratio % | BCl/% | Neutralizer |
|---|---|---|---|---|---|---|
| 19 | 50 | — | 50 | 97 | 6 | PO |
| 20 | 100 | — | — | 94.5 | 12 | CaO |
| 21 | 50 | — | 50 | 97 | 8.8 | CaO |
| 22 | 100 | — | — | 97 | 6 | CaO |
| 23 | 100 | — | — | 95 | 10 | CaO |
| 24 | 20 | 20 | 60 | 96.5 | 8 | CaO |

EXAMPLE 25

Polyether-amide made from 2,6-naphthalenedicarbonyl dichloride (NDC) and BAB
410.5 g (1.0 mol) of BAB were dissolved in 2051 g of dry NMP under nitrogen. 244.3 g (0.965 mol) of NDC were added at 5° C. The internal temperature first increased to 35° C.; the mixture was subsequently warmed to 70° C. After 60 minutes, 11.8 g (0.084 mol) of BCl were added, and, after a further 30 minutes, 62 g (1.1 mol) of CaO as a suspension in 33 g of NMP were added. The mixture was stirred for a further 90 minutes and worked up as in Example 8.

The investigation results are summarized in the table below.

EXAMPLES 26–30

Copolyether-amides made from NDC and other diacid chlorides
Analogous to Example 25, but BAB was introduced into 1200 g of NMP, and the homogeneous solution was added to the acid chlorides indicated in the table below in 763 g of NMP.

| Ex. | % NDC | % TPC | % IPC | % FDC | $[\eta]_o/dl \cdot g^{-1}$ | $M_n$ (PS standard) | D | $T_g$[a] | $T_g$[b] |
|---|---|---|---|---|---|---|---|---|---|
| 25 | 100 | 0 | 0 | 0 | 1.13 ± 0.01 | 43,000 | 2.9 | 229 | 228[c] |
| 26 | 50 | 50 | 0 | 0 | 0.83 ± 0.01 | 35,000 | 2.4 | 226 | 225 |
| 27 | 50 | 0 | 50 | 0 | 0.85 ± 0.05 | 31,000 | 2.7 | 226 | 226[d] |
| 28 | 70 | 0 | 30 | 0 | 0.89 ± 0.01 | 42,000 | 2.3 | 228 | 228 |
| 29 | 70 | 0 | 0 | 30 | 0.80 ± 0.03 | 41,000 | 2.3 | 227 | 228 |
| 30 | 33⅓ | 0 | 33⅓ | 33⅓ | 0.83 ± 0.05 | 38,000 | 2.2 | 223 | 227 |

[a] Glass transition temperature of the polymer powder
[b] Glass transition temperature of the pressed plate (vacuum, 340° C., 15 minutes: 0 bar; 5': 100 bar)
[c] Additionally a weak melt peak at 350° C. (1.1 J/g)
[d] Additionally a weak melt peak at 335° C. (0.5 J/g)

EXAMPLE 31

Copolyether-amide made from TPC, BAB and 2,2-bis(4-aminophenyl)propane (PBA)

Analagous to Example 25, but 246.3 g (0.6 mol) of BAB and 135.6 g (0.6 mol) of PBA were introduced into 2030 g of NMP and polycondensed with 235.1 g (1.158mol=96.5%) of TPC. Finally, 14.2 g (0.11 mol) of BCl and 74 g (1.3 mol) of CaO, suspended in 40 g of NMP, were added. After work-up as in Example 8, the following were measured:

Staudinger index $[\eta]_o = 0.82 \pm 0.01$ dl/g GPC (PS): $M_n = 35,000$ g/mol; D=2.2.

We claim:

1. A polymer alloy containing at least two components (a) and (b), wherein
    (a) is at least one thermoplastic aromatic polyetheramide of the formula (I)

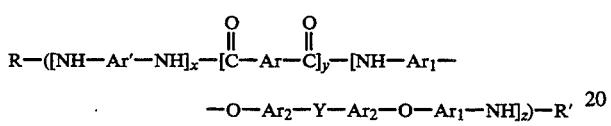

in which the symbols —Ar—, —Ar'—, —Ar$_1$—, —Ar$_2$—, —R—, —R'—, —Y—, x, y and z are as defined below:
—Ar— is at least one divalent, aromatic radical or heteroaromatic radical or an
—Ar*—Q—Ar*— group where —Ar*— is a divalent aromatic radical,
—Q' is a bond or an —O—, —CO—, —S—, —SO— or —SO$_2$— bridge,
—Ar'— is as defined for —Ar— or is an —Ar—C(CH$_3$)$_2$—Ar— or —Ar—O—Ar*—O—Ar— where —Ar*— is a divalent aromatic radical, —Ar$_1$— and —Ar$_2$— are identical or different and are each a para- or meta- arylene radical,
—Y— is a —C(CH$_3$)$_2$—, —SO$_2$—, —S— or —C(CF$_3$)$_2$— bridge,
where the sum of the molar fractions x, y and z is one,
the sum of x and z is not equal to y, and only x can adopt the value zero,
the ends of the polymer chain are fully blocked by monofunctional groups —R and —R' which are selected from the group consisting of benzoyl, anilino, phthaloylimido and naphthalimido radicals, which radicals may be substituted by a halogen atom or an organic residue and
the polyether-amide has a Staudinger index of from 0.4 to 1.5, measured at 25° C. in N-methyl-2-pyrrolidone and
(b) is at least one cycloolefin polymer, where the proportion of (a) is 99–50% by weight, and the proportion of (b) is 1–50% by weight, based on the sum of the proportions of (a) and (b).

2. The polymer alloy as claimed in claim 1, wherein the proportion of component (a) is 98–60% by weight and that of component (b) is 2–40% by weight.

3. The polymer alloy as claimed in claim 2, wherein the proportion of component (a) is 95–85% by weight and that of component (b) is 5–15% by weight.

4. The polymer alloy as claimed in claim 1, wherein the viscosity of component (b) is greater than 20 cm$^3$/g.

5. The polymer alloy as claimed in claim 1, wherein the structural element

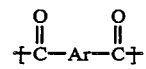

of component (a) is derived from 2,5-furandicarboxylic acid, terephthalic acid or isophthalic acid, or a combination thereof.

6. The polymer alloy as claimed in claim 1, wherein component (a) contains structural units derived from 2,2-bis[4-(4-aminophenoxy)phenyl]propane or bis[4-(4'-aminophenoxy)phenyl]sulfone, or a combination thereof.

7. The polymer alloy as claimed in claim 1, wherein component (b) contains structural units derived from at least one monomer of the formulae IX to XIV or XV

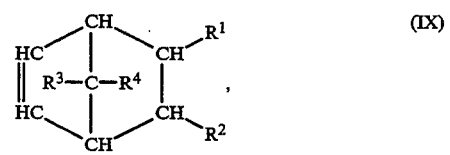
(IX)

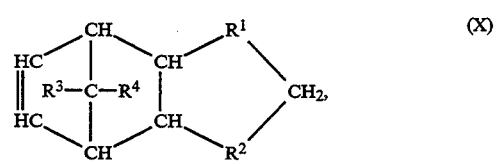
(X)

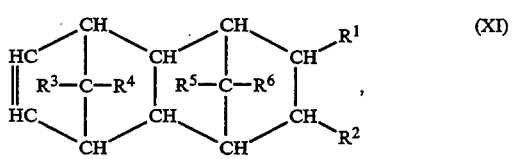
(XI)

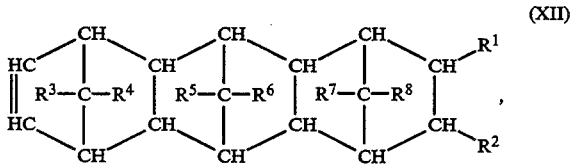
(XII)

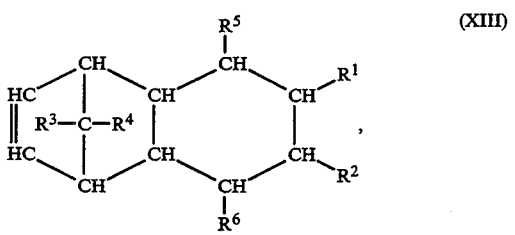
(XIII)

(XV)

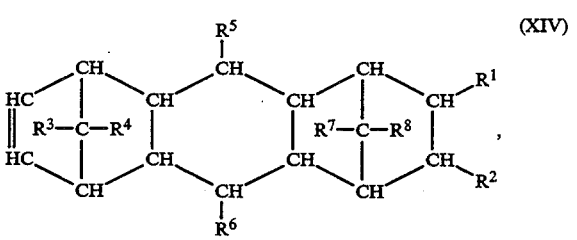
(XIV)

in which $R^1$, $R^2$, $R^3$, $R^4$, $R^5$, $R^6$, $R^7$ and $R^8$ are identical or different and are hydrogen atoms or $C_1$–$C_8$-alkyl radicals, and n is an integer from 2 to 10.

8. The polymer alloy as claimed in claim 7, wherein, in addition to the structural units derived from at least one monomer of the formulae IX to XV, component (b) contains further structural units derived from at least one acyclic 1-olefin of the formula XVI

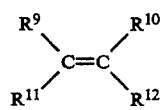
(XVI)

in which $R^9$, $R^{10}$, $R^{11}$ and $R^{12}$ are identical or different and are hydrogen atoms or $C_1$–$C_8$-alkyl radicals.

9. The polymer alloy as claimed in claim 8, wherein component (b) is a copolymer of polycyclic olefins of the formula IX or XI and at least one acyclic olefin of the formula XVI.

10. The polymer alloy as claimed in claim 1, wherein component (a) contains structural units of the following formula

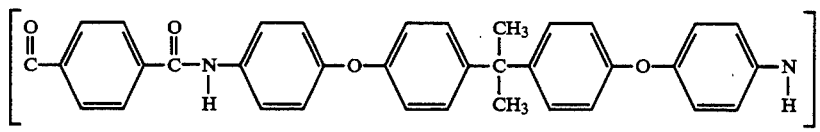

and component (b) is a copolymer of norbornene and ethylene.

11. The polymer alloy as claimed in claim 1, wherein component (a) contains structural units of the following formulae

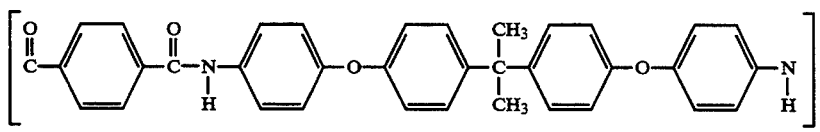

and

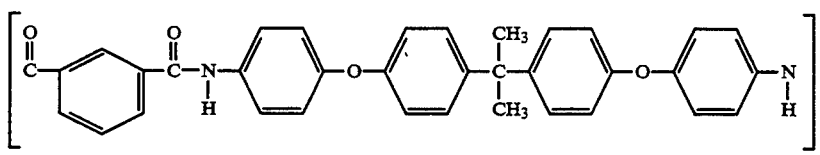

and component (b) is a copolymer of norbornene and ethylene.

12. A polymer alloy molding comprising the polymer alloy as claimed in claim 1.

13. The polymer alloy as claimed in claim 1, wherein the radical —Ar— of the polyether-amide (a) carries one or two substituents selected from $C_1$–$C_3$-alkyl, $C_1$–$C_3$-alkoxy, aryl, aryloxy, branched or unbranched $C_1$–$C_6$-perfluoroalkyl and perfluoroalkoxy radicals, fluorine, chlorine, bromine and iodine.

14. The polymer alloy as claimed in claim 1, wherein 2 or 3 different radicals Ar are bonded simultaneously in the polyether-amide (a).

* * * * *